United States Patent [19]

Harris

[11] Patent Number: 4,895,211
[45] Date of Patent: Jan. 23, 1990

[54] LAND CLEARING ROOT PLOW AND SOIL AERATOR

[76] Inventor: Edwin D. Harris, Rt. 2, Box 27, Mathis, Tex. 78368

[21] Appl. No.: 115,348

[22] Filed: Nov. 2, 1987

[51] Int. Cl.⁴ .............................................. A01B 13/00
[52] U.S. Cl. .................................... 172/271; 172/439; 172/698; 172/720
[58] Field of Search .............. 172/720, 699, 698, 136, 172/36, 44, 721, 724, 439, 700, 196, 702; 37/2 R, 141 R

[56] References Cited

U.S. PATENT DOCUMENTS

| | | | |
|---|---|---|---|
| 1,336,821 | 4/1920 | Curtiss | 172/698 |
| 2,688,910 | 9/1954 | Adair | 172/699 X |
| 2,703,044 | 3/1955 | Adair | 172/698 |
| 2,765,724 | 10/1956 | Kinsinger | 172/699 X |
| 2,877,572 | 3/1959 | Dyess | 37/2 R |
| 3,032,123 | 5/1962 | Brown | 172/239 X |
| 3,048,229 | 8/1962 | Simpson | 172/699 X |
| 3,101,794 | 8/1963 | Bechman | 172/720 X |
| 3,207,232 | 9/1965 | Bechman | 172/698 X |
| 3,425,368 | 2/1969 | Haynes | 172/720 X |
| 4,079,789 | 3/1978 | Byrd | 172/699 X |
| 4,355,475 | 10/1982 | Harkness | 172/698 X |
| 4,356,644 | 11/1982 | Harkness | 172/698 X |
| 4,506,739 | 3/1985 | Mascaro | 172/699 X |
| 4,749,048 | 6/1988 | Kelly | 172/699 |

FOREIGN PATENT DOCUMENTS

| | | | |
|---|---|---|---|
| 0223969 | 5/1958 | Australia | 172/700 |
| 0054157 | 3/1955 | India | 172/439 |

OTHER PUBLICATIONS

Taylor-Way Brochure for 3-Point Subsoilers, Taylor Implement Division of Pittsburg Forgings Co., Dec. 1978.

Primary Examiner—Randolph A. Reese
Assistant Examiner—Jeffrey L. Thompson
Attorney, Agent, or Firm—Cox & Smith

[57] ABSTRACT

A plow having a forwardly facing V-notched digger blade, lifting wings, side arms, frame members, ears for attaching a hitch and breakable attachment of the hitch to the tow vehicle is provided. In use the plow cuts or digs out subterranean plant roots, and lifts soil for aeration.

29 Claims, 2 Drawing Sheets

LAND CLEARING ROOT PLOW AND SOIL AERATOR

BACKGROUND OF THE INVENTION

This invention relates to a land-clearing plow. More particularly, this invention relates to a land-clearing sub-soil plow designed to pull out brush and small trees by the roots, as well as to aerate the soil.

Root plows of various types have been known for many years. Typical root plows used in this country are disclosed in U.S. Pat. Nos. 3,101,794 and 3,032,123. Subsoil plows, for cultivating under and around rows of plants, and for aerating the soil prior to planting, have been known for a long time as well. For example, U.S. Pat. Nos. 3,048,229 and 2,688,910 disclose subsoil plows of typical construction.

South Texas presents unique problems in land clearing because it has a hard-packed caliche soil covered with heavy brush and low-growing mesquite trees. The mesquite trees have long tap roots which must be pulled out to clear an area for farming or grazing.

Presently available root plows suffer from the disadvantage that a very large tractor is usually required for pulling the plow, and such plows are impractical for use by the small farmer who needs to clear relatively small trees and brush from dense clay soils or caliche. The land clearing plow of the present invention is adapted for use with a tractor having a three point hitch, rather than large tractors having two-point hitches.

Presently known plow blades for use with standard size farm tractors are not effective for pulling out mesquite trees by the roots, since the tap root of a mesquite tree can extend as far as 10–25 feet deep. Root plows for use with larger tractors are usually required to be located in close vicinity to the tractor so such plows can utilize the leverage of the tractor's weight when engaging tenacious tree roots.

A primary object of the present invention is the provision of an improved land clearing root plow and sub-soil aerator.

Another object of the present invention is the provision of an improved land clearing root plow which can be mounted to a standard three-point hitch of a standard size farm tractor.

Another object of the present invention is the provision of a land clearing root plow which permits the plow blade to be moved both forward and backward, so that the plow blade bites into and securely engages large mesquite tap roots, or the blade cuts below the ground surface of smaller plants, thus severing such plants from their roots and effectively destroying brushy plants.

Yet another object of the present invention is the provision of a land clearing plow having a shear pin placed near the joinder of the side arms of the plow, to prevent damage caused by overload to either the plow or the tractor when the plow blade hangs up on a tap root which may be too large or too deeply embedded in hard soil.

A further object of the present invention is the provision of a land clearing plow which has an off-set cross beam on the frame located sufficiently distant from the plow arms and plow blade to prevent excessive forces being exerted on the tractor hitch, thus protecting against breaking the hitch or the plow.

Yet another object of the present invention is to provide a land clearing plow which is efficient in use, less expensive to manufacture, and durable.

These and other objects, features and advantages of the invention are accomplished by providing a land clearing root and subsoil aerating plow of unique design and utility disclosed in the following detailed description of a presently preferred embodiment of the invention.

SUMMARY

These and other objects and advantages of the present invention are met by providing a land clearing root plow including means enabling extraction of vegetation from the soil and means for aerating the soil while the plow is being pulled by a tractor comprising an inverted spoon-shaped digger blade rigidly attached at its sides to lifting wings, the digger blade provided with a frontwardly facing cutter blade provided with a V-notch, a backwardly facing cutter blade provided with a straight edge being cut toward an upper surface, a frame member, and a means for attaching a hitch, the lifting wings and hitch attachment means rigidly mounted to opposing ends of the frame member.

DETAILED DESCRIPTION OF THE PREFERRED EMBODIMENT

Referring to FIGS. 1, 2, 3 and 4, a land clearing root and soil aerating plow constructed according to the teachings of the present invention is illustrated generally at 10.

A plow blade 12 is provided with a forward facing V-notch 14, which is beveled from a bottom edge to a top edge, and a backward-facing straight edge 16, the upper surface of which is beveled, to promote smoothness in cutting through soil. In a presently preferred embodiment plow blade 12 is concave in both cross-section and sagittal section, and is shaped similarly to an inverted spoon bowl and having the concave surface facing downwardly.

Figure 3:
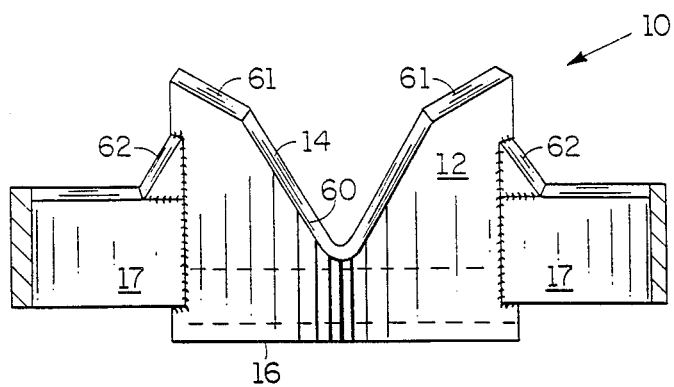
FIG. 3 is a top view partially broken away, of the plow blade and lifting wings of the present invention.
Figure 4:
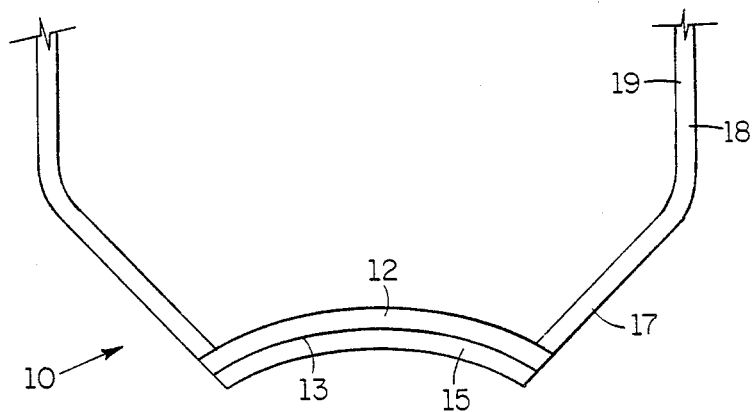
FIG. 4 is an end view partially broken away, of the plow blade, steel plate and side arms of the present invention.
Figure 5:
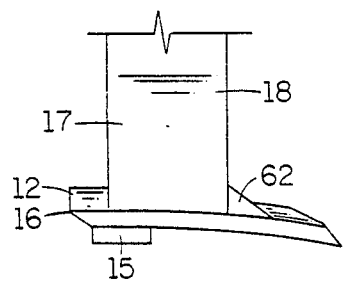
FIG. 5 is a side view, partially broken away, of the plow blade, the side arms and the steel plate of the present invention.

In a presently preferred embodiment plow blade 12 is welded to lifting wings 17 of sidearms 18. plow blade 12 is substantially rectangular except it has V-notch 14 facing forward. Plow blade 12 has straight edge 16 facing backward. Each of lifting wings 17 are also referred to as a "footpiece" 17. The forward edges of wings 17 of side arms 18 are beveled to enable forcing said side arms 18 through soil. As is evident in FIG. 3, the angle of the V-notch 14 is acute in its central portion 60 but is obtuse in its outer portions 61. When plow 10 is pulled forward by a standard size farm tractor, (not shown) V-notch 14 engages roots of trees and shrubs, either cutting through such roots or biting into the roots and pulling them out of the ground as the tractor moves forward. Plow blade 12 is preferably constructed of an abrasive-resistant steel. Referring to FIGS. 3 and 4, a steel plate 15 is rigidly mounted along straight edge 16 of concave surface 13 of plow blade 12, for reinforcement of plow blade 12.

Referring again to FIGS. 1 and 2, side arms 18 each comprise a first member 19 and a second member ("wing") 17 formed integral with one another. Each first member 19 is perpendicular to the respective frame arm 22 to which it is connected by braces 20. Wings 17 project generally inwardly (i.e. toward one another) from first members 19 and are obliquely oriented relative to first members 19. First members 19 of side arms 18 are welded to braces 20. The braces 20 are preferably welded to frame arms 22 at a first end 24 of frame arms 22. Braces 20 reinforce side arms 18. Braces 20 can also be releasably secured to frame arms 22 with bolts 26 and nuts 28. Thus plow blade 12 can be repositioned having the V-notch 14 facing backward and straight edge 16 facing forward, for use as a soil-aerating plow or for clearing shrubs and underbrush by pushing plow 10 rather than pulling plow 10.

Figure 1:
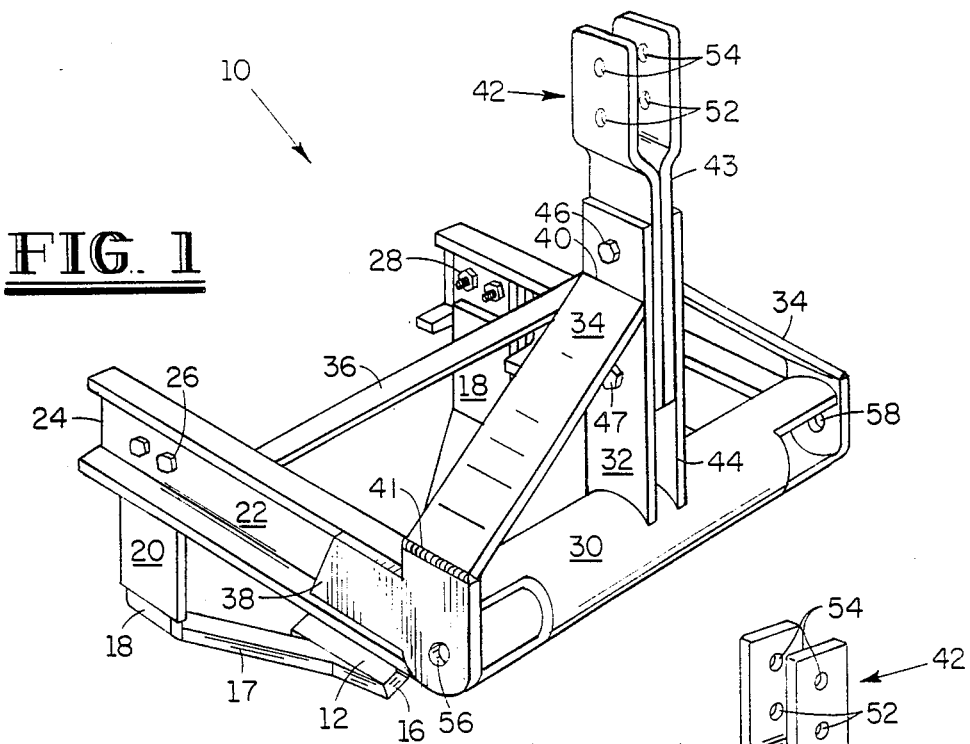
FIG. 1 is a front perspective view of the apparatus of the present invention.
Figure 2:
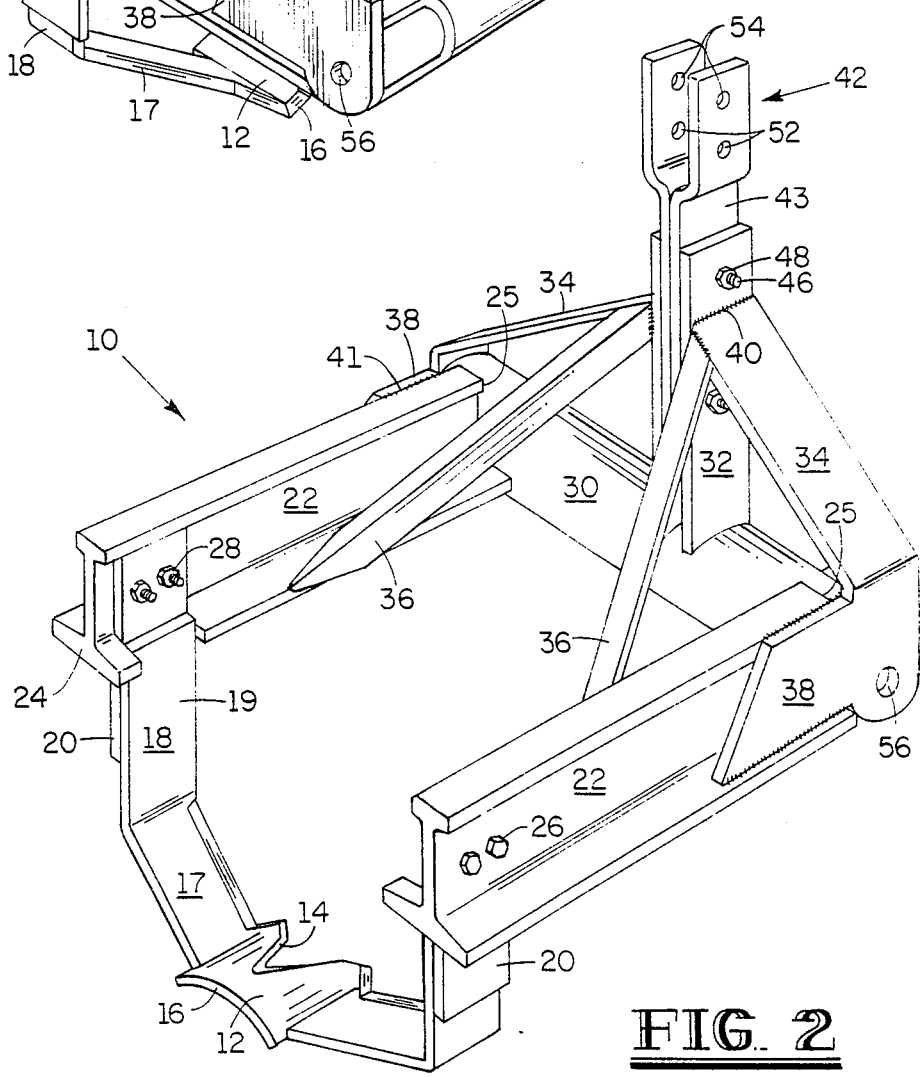
FIG. 2 is a rear perspective view of the apparatus of the present invention.

Referring to FIGS. 1 and 2, a frame for the presently preferred embodiment comprises frame arms 22, pipe 30 rigidly mounted between frame arms 22, hitch arms 32 and brace arms 34 and diagonal brace arms 36. Pipe 30 is also referred to as a "cross-bar" 30. Frame arms 22 comprise elongate members which are perpendicular to side arms 18 and have first ends 24 and second ends 25. First ends 24 are also referred to as "rear ends" 24, and second ends 25 are also referred to as "forward ends" 25. The frame of the presently preferred embodiment has a forward and a rearward end corresponding with the forward ends 25 and the rearward ends 24, respectively, of frame arms 22. Second ends 25 are preferably welded to pipe 30, pipe 30 extending between the respective second ends 25 of frame arms 22. Pipe 30 is formed integral with the second ends 25 of frame arms 22. Pipe 30 is provided with vertical hitch arms 32, which are rigidly mounted perpendicular to pipe 30 and which form a slot 44 therebetween. Hitch arms 32 are centered along the length of pipe 30, the attachment thereof bisecting the length of pipe 30. The length of frame arms 22 between side arms 18 and pipe 30 is at least three feet.

End brace arms 34 and diagonal brace arms 36 support and reinforce hitch arms 32. End brace arms 34 are provided with bottom tabs 38 integral with end brace arms 34. End brace arms 34 are rigidly mounted at first ends to hitch arms 32 and at second ends 41 to ends of pipe 30. Hitch mount 42 has a Y-shaped configuration and is constructed of elongate members 43 received within slot 44 of hitch arms 32. Hitch mount 42 is breakably secured within slot 44 by overload shear pin 46. Overload shear pin 46 is placed through opposable holes 48 in hitch arms 32 and through holes 50 (not shown) in hitch mount 42, as is evident in FIGS. 1 and 2. A second pin 47 is disposed through holes in hitch arms 32 and hitch mount 42.

Diagonal brace arms 36 extend between hitch arms 32 and frame arms 22, bracing against both vertical and horizontal forces exerted on hitch arms 32. Hitch mount 42 is further provided with opposable holes 52 and 54 and opposable holes 56 and 58 through elongate members 43. Opposable holes 52 and 54 and opposable holes 56 and 58 are spaced apart by the Y-shaped configuration of elongate members 43 of hitch mount 42. Opposable holes 52 and 54 and holes 56 and 58 provide selective attachment sites for attachment of plow 10 to a three-point tractor hitch. The plow 10 can be adapted for releasable attachment to category 1, 2, or 3 plows, as is known to those of skill in the art.

In general, the plow 10 is pulled or drawn behind a tow vehicle such as a standard sized tractor. As plow 10 is pulled through dirt in an area of underbrush, V-notch 14 cuts through soil and subterranean plant roots. If a large root is encountered, V-notch 14 of plow blade 12 engages the root by biting into the root and forcibly engaging the root within the V-notch 14. As the plow 10 is drawn further forward, the large root is then pulled from the soil. Referring to FIG. 4, it can be seen that lifting wings 17 and side arms 18 lift the soil as would an airfoil forced through a liquid medium. The side arms 18 and lifting wings 17 produce a lift with respect to the soil being plowed.

Although the invention has been described in conjunction with the foregoing specific embodiment, many alternatives, variations and modifications are apparent to those of ordinary skill in the art. Those alternatives, variations and modifications are intended to fall within the spirit and scope of the following claims.

What is claimed is:

1. A subsoil plow for aerating soil and pulling plants by their roots, which plow is adapted for use with a tractor, comprising:

a frame having a forward end and a rearward end;

means for connecting the forward end of said frame to a tractor;

a plow blade provided with a forward facing V-notch which has a central portion and an outer portion, said central portion being of an acute angle and said outer portion being of an obtuse angle; and a first side arm and a second side arm connecting said plow blade to said frame, each of said side arms having a first member and a second member, the first member of each being rigidly connected to said frame at the rearward end thereof and extending downwardly therefrom, the second member of each being integral with the respective first member and extending downwardly at an obtuse angle from the lower end of the first member toward the second member of the other of said side arms, the second member of each of said side arms also being rigidly connected to said plow blade.

2. The subsoil plow of claim 1 wherein:

said frame comprises elongate frame arms positioned lengthwise between the forward end and the rearward end of said frame, said elongate frame arms being parallel to one another; and the first members of said side arms are rigidly connected to said elongate frame arms at the rearward end of said frame and are perpendicularly oriented relative to said frame arms.

3. The subsoil plow of claim 2 wherein:

said connecting means is rigidly connected to said frame and includes first and second hitch arms protruding generally upwardly relative to said frame arms and being parallel to the first members of said side arms.

4. The subsoil plow of claim 3 wherein said frame further comprises a cross-bar positioned between said elongate frame arms at the forward end of said frame, said cross-bar being rigidly connected to each of said frame arms, said hitch arms being rigidly connected to said cross-bar near the center thereof.

5. The subsoil plow of claim 4 wherein said connecting means further comprises a breakable connection along said hitch arms comprising a shear pin.

6. The subsoil plow of claim 3 further comprising brace members for reinforcement of said hitch arms and said frame arms, each of said brace members being rigidly connected at a first end to said hitch arms and at a second end to said frame arms.

7. The subsoil plow of claim 6 wherein said brace members extend rearwardly from said hitch arms.

8. The subsoil plow of claim 2 wherein said side arms are releasably connected to said elongate frame arms.

9. The subsoil plow of claim 2 further comprising braces integrally connected with said side arms for reinforcing said side arms, said braces being interposed between said side arms and said frame arms.

10. The subsoil plow of claim 1 wherein the upper surface of the V-notch of said plow blade is beveled.

11. The subsoil plow of claim 10 wherein the lower surface of said blade is concave.

12. The subsoil plow of claim 1 wherein each of said side arms has a forward facing edge which is beveled.

13. The subsoil plow of claim 1 wherein the second member of each of said side arms has a forward facing edge which is beveled on the upper surface thereof.

14. The subsoil plow of claim 1 further comprising gussets rigidly connected between said plow blade and said side arms, each of said gussets being integrally connected with said plow blade and being integrally connected with one of said side arms at a forward facing edge thereof.

15. The subsoil plow of claim 1 wherein said plow blade has a rearwardly facing edge which is beveled.

16. A subsoil plow for aerating soil and pulling plants by their roots, which plow is adapted for use with a tractor, comprising:
   a frame having a forward and a rearward end, said frame comprising elongate frame arms positioned length-wise between the forward end and the rearward end thereof, said elongate frame arms being parallel to one another;
   a plow blade;
   a first side arm and a second side arm connecting said plow blade to said frame, each of said side arms having a first member and a second member, the first member of each being rigidly connected to one of said elongated frame arms at the rearward end of said frame and extending downwardly therefrom, said first members being perpendicularly oriented relative to said frame arms, the second member of each being integral with the respective first member and extending downwardly at an obtuse angle from the lower end of the first member toward the second member of the other of said side arms, the second member of each of said side arms also being rigidly connected to said plow blade; and
   means for connecting the forward end of said frame to a three-point hitch linkage of a tractor; said connecting means being rigidly connected to said frame and including a first and a second hitch arm protruding generally upwardly from said forward end of said frame and being parallel to the first members of said side arms.

17. The subsoil plow of claim 16 wherein said frame further comprises a cross-bar positioned between said elongate frame arms at the forward end of said frame, said cross-bar being rigidly connected to each of said frame arms, said hitch arms being rigidly connected to said cross-bar near the center thereof.

18. The subsoil plow of claim 16 wherein said connecting means further comprises a breakable connection along said hitch arms comprising a shear pin.

19. The subsoil plow of claim 16 wherein the upper surface of the V-notch of said plow blade is beveled.

20. The subsoil plow of claim 16 wherein each of said side arms has a forward facing edge which is beveled.

21. The subsoil plow of claim 16 wherein the second member of each of said side arms has a forward facing edge which is beveled on the upper surface thereof.

22. The subsoil plow of claim 16 further comprising gussets rigidly connected between said plow blade and said side arms, each of said gussets being integrally connected with said plow blade and being integrally connected with one of said side arms at a forward facing edge thereof.

23. The subsoil plow of claim 16 wherein the lower surface of said blade is concave.

24. The subsoil plow of claim 16 wherein said side arms are releasably connected to said elongate frame arms.

25. The subsoil plow of claim 16 further comprising braces integrally connected with said side arms for reinforcing said side arms, said braces being interposed between said side arms and said frame arms.

26. The subsoil plow of claim 16 wherein said plow blade has a rearwardly facing edge which is beveled.

27. The subsoil plow of claim 16 further comprising brace members for reinforcement of said hitch arms and said frame arms, each of said brace members being rigidly connected at a first end to said hitch arms and at a second end to said frame arms.

28. The subsoil plow of claim 27 wherein said brace members extend rearwardly from said hitch arms.

29. The subsoil plow of claim 16 wherein said plow blade is provided with a forward facing V-notch.

* * * * *

UNITED STATES PATENT AND TRADEMARK OFFICE
CERTIFICATE OF CORRECTION

PATENT NO. : 4,895,211

DATED : January 23, 1990

INVENTOR(S) : Edwin D. Harris

It is certified that error appears in the above—identified patent and that said Letters Patent is hereby corrected as shown below:

In claim 19, line 20, delete "16" and substitute --29--.

Signed and Sealed this

Twelfth Day of March, 1991

Attest:

HARRY F. MANBECK, JR.

*Attesting Officer*  *Commissioner of Patents and Trademarks*